(No Model.)
G. M. BAILEY.
PRUNING IMPLEMENT.
No. 549,623.   Patented Nov. 12, 1895.
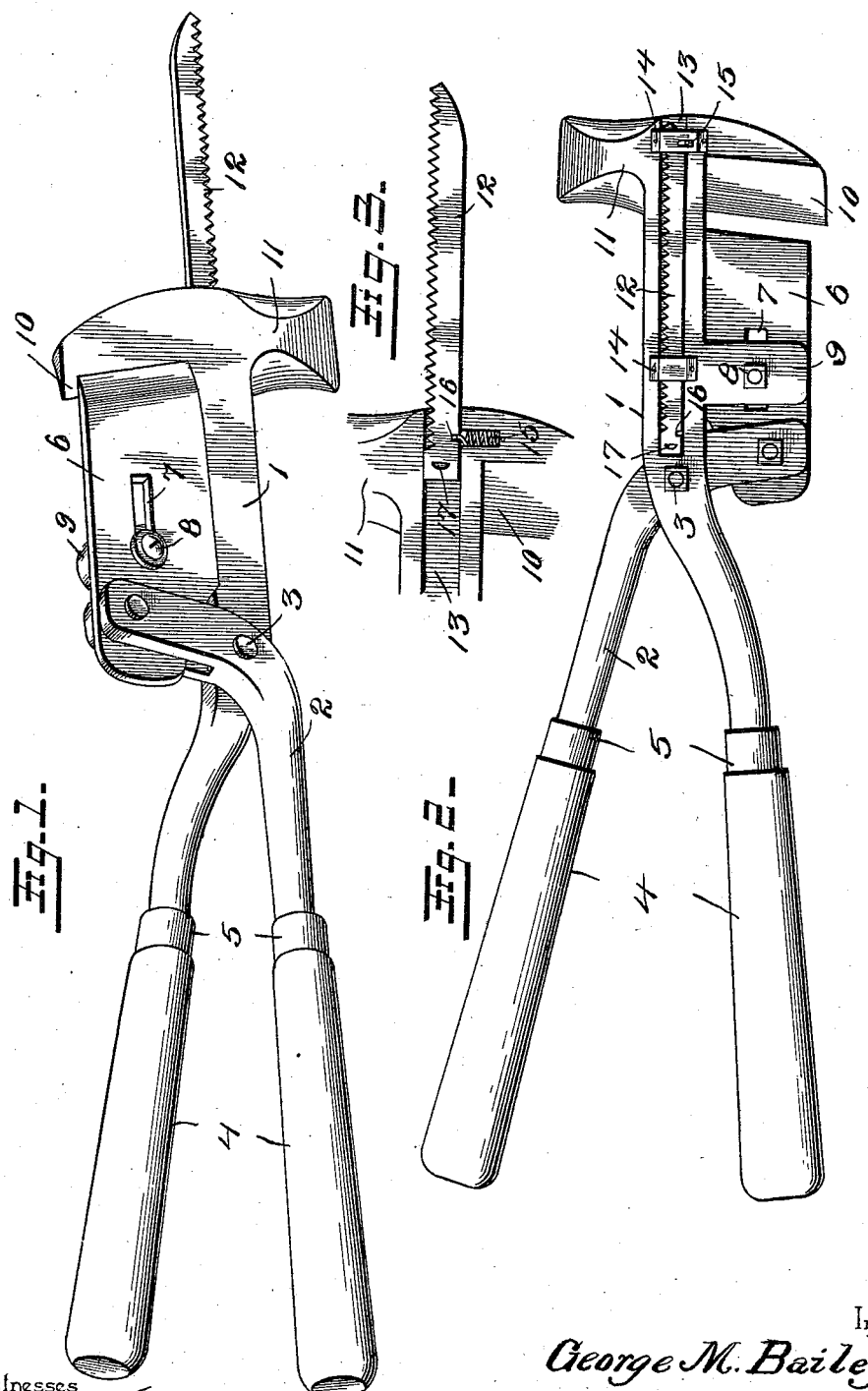
Witnesses
W. J. Koerth.
L. M. Smith.
Inventor
George M. Bailey,
By his Attorneys,
C. A. Snow & Co.

UNITED STATES PATENT OFFICE.

GEORGE M. BAILEY, OF BOWIE, TEXAS.

PRUNING IMPLEMENT.

SPECIFICATION forming part of Letters Patent No. 549,623, dated November 12, 1895.

Application filed July 20, 1895. Serial No. 556,609. (No model.)

*To all whom it may concern:*

Be it known that I, GEORGE M. BAILEY, a citizen of the United States, residing at Bowie, in the county of Montague and State of Texas, have invented a new and useful Pruning Implement, of which the following is a specification.

This invention relates to an improvement in devices for pruning trees and also for cutting brush and trimming hedges.

The objects in view are to provide a simple, inexpensive, and efficient pruning implement having a reciprocating knife or blade for ordinary pruning purposes, and also having in addition thereto a hatchet-blade of peculiar form and an extensible saw-blade, which is seated within a groove or recess in the shank of the implement and capable of being extended and held in operative position by means of a retaining-spring.

Other objects and advantages of the invention will be set forth in the ensuing description.

The invention consists in a combination pruning implement embodying certain novel features and details of construction and arrangement of parts, as hereinafter particularly set forth, illustrated in the drawings, and finally pointed out in the claim.

In the accompanying drawings, Figure 1 is a perspective view of the improved pruning implement constructed in accordance with this invention. Fig. 2 is an elevation of the same taken from the opposite side. Fig. 3 is a detailed elevation showing the form of the spring-catch for engaging the saw-blade.

Similar numerals of reference designate corresponding parts in the several figures of the drawings.

Referring to the drawings, 1 designates the main stock or handle of the device and 2 a handle-lever, which is pivotally connected with the stock 1 by means of a bolt or other suitable fastening device 3. The shanks of both of the parts 1 and 2 are extended in such manner as to adapt them to receive and have applied thereto a pair of wooden handles 4 of any desired length, said handles being provided with the usual ferrules or thimbles 5, which embrace their inner ends and prevent the same from splitting. The lever-handle 2 is curved where it crosses the stock 1 and has its end bifurcated or forked to receive the rear end of a reciprocating blade 6, which is mounted upon a bolt or pivot passing through the bifurcated end of the lever-handle 2, and is formed with a central longitudinal slot 7, which receives and adapts said blade to slide upon a bolt or rivet 8, passing through a lateral extension 9 of the stock 1, as shown. The forward or operative end of the blade 6 is provided with a knife-edge disposed in a slightly oblique relation to the direction in which said blade moves and is adapted to be reciprocated toward and away from a fixed blade 10, in the form of a lateral extension on the stock 1. By reason of this particular arrangement of the reciprocating blade and its actuating lever the device is rendered very powerful in operation and will sever with ease a good sized branch or limb.

Upon the opposite side of the stock 1 to that upon which the reciprocating blade is arranged is a hatchet-blade 11, which is preferably formed integrally with said stock, and in addition to having its lateral or side edge sharpened in the usual manner, has its upper and lower or top and bottom edges also sharpened, thereby adapting said blade to be placed beneath a limb and employed in the capacity of a chisel for severing the same, or to be placed above and drawn downwardly against such limb for severing the same from above, thus greatly increasing the utility of said hatchet-blade.

12 designates a saw-blade, which normally rests within a grove or recess 13 in the stock 1, said blade being held in place and prevented from lateral escape by means of straps or guards 14, which extend across said groove or recess. The saw-blade thus arranged may be drawn outwardly from the open end of such groove or recess and when in its extended position is engaged by means of a spring 15, secured to the stock 1, adjacent to the extremity thereof, and operating as a catch to engage a notch 16 in the rear edge of the saw-blade.

17 indicates a nail-notch which may be engaged by the finger-nail of the operator for thrusting the saw-blade outward, when desired for use.

By means of the construction above described a very simple, strong, and particularly useful pruning implement is obtained, wherein provision is made for severing branches or limbs by means of a reciprocating knife or blade or for chopping the same by means of the peculiar form of hatchet-blade referred to. Where the limb is of a very considerable size the adjustable saw-blade may be utilized, thus greatly increasing the practical value of the device as a whole, and adapting the same to a class of work which would be impossible of accomplishment by implements of a similar character as heretofore constructed.

Various changes in the form, proportion, and minor details of construction may be resorted to without departing from the spirit or sacrificing any of the advantages of this invention.

Having thus described the invention, what is claimed as new, and desired to be secured by Letters Patent, is—

The herein described pruning implement, comprising a stock having a longitudinal groove or depression 13 formed in its side face, a saw blade 12 seated within said groove and lying flush with the face of the implement and provided with a nail notch 17, straps or guards 14 extending transversely over and across said groove, and a spiral spring arranged in a transverse recess in the stock and having one of its terminals in engagement with the saw blade, substantially as specified.

In testimony that I claim the foregoing as my own I have hereto affixed my signature in the presence of two witnesses.

GEORGE M. BAILEY.

Witnesses:
WM. C. TAGE,
OLIVER SEARS.